Patented Sept. 10, 1940

2,214,254

UNITED STATES PATENT OFFICE 2,214,254

METHOD FOR REACTING HIGHER ALCOHOLS WITH SULPHATING AGENTS

Victor Mills and Richard C. Wood, Cincinnati, Ohio, assignors to The Procter & Gamble Company, Cincinnati, Ohio, a corporation of Ohio No Drawing. Application January 18, 1939, Serial No. 251,596

13 Claims. (Cl. 260—459)

This invention relates to an improved method for reacting higher alcohols with the sulphating agents described below to form salts of the sulphuric esters of the alcohols, having good wetting, sudsing, emulsifying, and detergent properties. It consists essentially in mixing the higher alcohol or a mixture of such alcohols with the product obtained by reacting sulphur trioxide with a metal chloride or by reacting chlorsulphonic acid with a metal chloride or sulphate, and then subjecting the mixture to a high temperature while in an atomized state. The sulphur trioxide reaction product is believed to consist mainly of the chlorpyrosulphonate while the chlorsulphonic acid reaction product is believed to consist mainly of the chlorsulphonate of the metal. Both of these reaction products, however, act alike in the present sulphating process.

The object of the invention is to provide a new and improved method for carrying out the above mentioned reaction.

The general process of sulphating higher alcohols with the above mentioned reagents and thereby making products having good wetting, sudsing, emulsifying and detergent properties has been patented by Messrs. Snoddy and Martin in U. S. patents numbered 2,049,670, 2,075,914, and 2,075,915. The Snoddy and Martin process, however, as described, is a batch process requiring careful control of temperature to prevent undesirable side reactions during the relatively long period required for reaction and has drawbacks due to frothing and to difficulty in ridding the mixture of the hydrochloric acid gas formed in the reaction.

The present invention is directed to a process which overcomes these difficulties by causing the reaction to take place in minute particles at a high temperature, under which conditions no objectionable frothing occurs, while the reaction takes place almost instantaneously with practically no development of undesirable by-products or darkening of the product, and the hydrochloric acid gas formed in the reaction escapes readily.

In carrying out our process we mix the alcohols at ordinary room temperature, or at a slightly elevated temperature if necessary to liquefy the alcohol, with the finely divided dry reaction product consisting predominantly of a metal chlorsulphonate or chlorpyrosulphonate. The mixture of alcohol and sulphating agent may be prepared by a continuous mixing process if desired, before spraying into the spray chamber. The sodium salts are generally used. This mixture, in a flowing condition, is pumped through a spray nozzle into a chamber containing air or other suitable gas which has been heated to a high temperature, whereby the sprayed particles are quickly raised to a reacting temperature. The air preferably passes in countercurrent direction to that of the sprayed alcohol mixture. The reaction begins almost instantaneously or within a very few seconds, and in the first stage there is no evolution of hydrochloric acid gas as this seems to dissolve in the reacting mass until the reaction has progressed to a considerable extent and the temperature has risen. When atomized as in our process at a high temperature the reaction progresses rapidly and the hydrochloric acid gas readily escapes.

The starting of the reaction is greatly accelerated by the presence of small quantities of moisture, and in order to keep it under control, especially in the early stages, we find it advantageous to have the reagent dry and to reduce the moisture content of the alcohol to 0.2 per cent or less. By proper adjustment of the moisture content, height of chamber, temperature and velocity of air, the reaction can be kept under control and made substantially complete before the particles fall to the bottom of the chamber. The completed reaction product containing the salt of the sulphated alcohol in dry form thus falls to the bottom of the chamber from which it is continuously removed, while the hydrochloric acid gas liberated in the reaction passes away with the exhaust air.

The alcohols suitable for use in our process may consist of any of the higher alcohols containing more than eight carbon atoms per molecule, or mixtures of such alcohols, especially those obtained from sperm oil by saponification and distillation, those obtained from natural fats and oils by catalytic reduction with hydrogen at high temperatures and pressures, or by reduction of fatty acids with metallic sodium in the well known Bouveault and Blanc procedure, or they may consist of alcohols made by the oxidation of petroleum fractions, or by other synthetic procedures.

Higher alcohols of the fatty series yield products having good wetting, sudsing, and detergent properties. Alcohols of relatively low molecular weight, such as lauryl alcohol, react rather quickly with the chlorsulphonates and chlorpyrosulphonates even at ordinary temperatures, and hence the mixture must be transferred to the spray chamber promptly after mixing. Alcohols of higher molecular weight react more slowly at ordinary or slightly elevated temperatures. Alcohols which are solid at ordinary temperatures, such as stearyl alcohol, must be heated sufficiently to melt them before mixing. Oleyl alcohol, or a mixture of alcohols in which oleyl predominates, is very easily handled by our process and makes a very satisfactory detergent product.

The sulphating reagents may be made by either of the following procedures.

In preparing our reagent with the use of sulphur trioxide and sodium chloride, or other metal chloride, we pass the sulphur trioxide gas into an acid resistant chamber containing pulverized sodium chloride, and agitate the mixture while cooling same to prevent the temperature from rising higher than about 30° C. The product is a solid in powder form.

In preparing our reagent with chlorsulphonic acid we mix the commercial chlorsulphonic acid with the sodium chloride or sulphate or corresponding salt of other metal at room temperature. A vigorous reaction ensues with a rise of temperature, and evolution of hydrochloride acid gas when chlorides are used. The temperature is preferably kept below about 50° C., as side reactions take place at higher temperatures with evolution of chlorine in some cases.

In making these reagents by either procedure, moisture must be excluded as moisture decomposes them.

It is desirable to have present in the reagent as used an excess of the dry salt (NaCl, Na$_2$SO$_4$, etc.) above the amount which enters into the reaction with sulphur trioxide or chlorsulphonic acid, as this makes a more friable mass, thus facilitating mixing and grinding. A desirable excess is from twenty-five per cent ot one hundred per cent above the quantity actually entering into the reaction.

The metal base of the chloride or sulphate used in making the sulphating reagent should be one which makes a water-soluble salt of the sulphated alcohol, and likewise the neutralizing agent subsequently used should be one which forms a water-soluble salt of the sulphated alcohol. The sodium salts are very desirable for this purpose, but potassium, magnesium, and other salts may also be used.

The sulphating agent is a solid and must be finely ground; at least fifty per cent should pass through a 200 mesh screen. We have obtained excellent results with a product containing about seventy per cent of active ingredient, and having the following characteristics:

|  | Per cent |
|---|---|
| Through 200 mesh | 80 |
| Through 100 mesh on 200 mesh | 15 |
| On 100 mesh | 5 |

The stoichiometrical proportion of sulphating agent may be used, and generally gives 90% to 95% of the calculated amount of sulphation, but we have found that an excess of twenty-five per cent above the theoretical amount of sulphating agent should generally be used to assure a higher percentage of sulphation, and an excess of even fifty per cent may be used, and usually gives still better results, usually as high as ninety-eight per cent. These excess amounts of sulphating reagent also serve to make the product more easily pulverizable.

The temperature required to initiate a rapid reaction varies with different alcohols, presence of moisture, and other factors, but in general may vary from ordinary room temperature to about 160° F. The reaction is usually slow in starting at ordinary room temperatures, but in any case the temperature rises rapidly after the reaction starts and the reaction is greatly accelerated by subjecting the mixture to a temperature of 200° F. or above. The temperature of the air or other gas entering the reaction chamber, therefore, should preferably be about 300° F. to 400° F., in order to allow for heat losses and to quickly heat the reacting mixture to about 200°–300° F. Under these conditions with a chamber from ten to thirty feet high the reaction is found to be complete in between three and five seconds. The product is a granular solid and the sulphation is from ninety per cent to ninety-eight per cent complete. Higher temperatures than about 300° F. tend to darken the product.

The quantity of heated air to be used must be sufficient to heat the mixture to the reaction temperature and maintain it within the above mentioned limits for a sufficient period of time to complete the reaction while the material is falling through the chamber.

The sulphated product thus obtained from the hot air chamber may then be treated with a neutralizing agent such as a solution of caustic soda or a solution of sodium carbonate or bicarbonate, or it may be mixed with a dry neutralizing agent such as sodium carbonate, for the purpose of neutralizing any excess of the sulphating agent used and any free hydrochloric acid which may not have escaped.

The reactions may be represented as follows, assuming that the SO$_3$-NaCl reaction product is mainly the chlorpyrosulphonate, and the HClSO$_3$-NaCl reaction product is mainly the chlorsulphonate, and R being the alkyl radical of an alcohol.

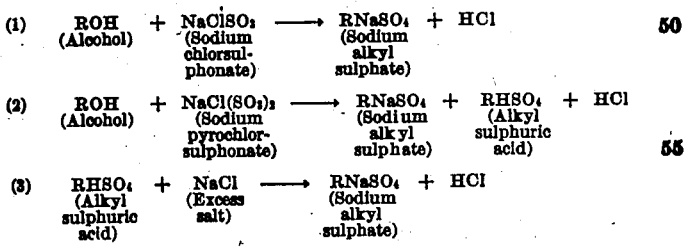

Reaction 3 appears to be incomplete so that some RHSO$_4$ remains in the mixture after reacting, together with some of the evolved HCl, and is neutralized by treating with a neutralizing agent consisting of finely ground metal oxide, hydroxide or carbonate in sufficient quantity to neutralize any acidity in the mixture, thus obtaining a solid product which when used in aqueous solution is found to have excellent wetting, sudsing, emulsifying and detergent properties without further purification. Of course the reaction mixture could also be neutralized by mixing with a solution or slurry of a metal oxide, hydroxide, or carbonate, especially if the product is to be used immediately in the wet condition, but the dry neutralization as described is preferable especially if the product is to be stored or shipped. Usually the same metal would be selected for neutralizing excess reagent as was used in making the reaction product, but in any event it should be one that does not form insoluble reaction products, either when dry or when added to water for use. The neutralized excess reagent may be allowed to remain in the neutralized product, as it is harmless for ordinary uses.

The neutralized product thus obtained from higher fatty alcohols has excellent wetting, sudsing, emulsifying and detergent properties, at least equal, if not superior, to the corresponding properties of similar products formed in the batch process at lower temperatures.

*Example.*—A mixture of alcohols sold under the commercial name of "Ocenol" was used, consisting of the alcohols derived from sperm oil by saponification and distillation, and containing approximately 65% oleyl alcohol, the balance being mainly palmityl alcohol. This had an iodine value of about 70, hydroxyl value 215, and a moisture content of about 0.2%. The sulphating agent was made by reacting 40 parts by weight of sulphur trioxide with 60 parts of sodium chloride, thus obtaining a product which contained about 55% of active sulphating agent $Na(SO_3)_2Cl$. This material was ground until most of it passed through a 200 mesh screen.

100 parts of Ocenol were intimately mixed with 112 parts of the above mentioned sulphating agent (50% in excess of the stoichiometrical amount) at a temperature under 90° F. This mixture was pumped to an atomizing nozzle where it was sprayed with the aid of compressed air into the top of a spray chamber approximately 25 feet high and 8 feet in diameter. The rate of spraying was 500 pounds of the mixture per hour, containing about 236 pounds of Ocenol. Heated air was introduced at the bottom of the chamber at a temperature of 400° F. but due to loss of heat by radiation, etc., the actual temperature inside the tower was approximately 270° F. The amount of air used was about 100 cubic feet per pound of mixture sprayed. This volume of air was ample to maintain the mixture in the chamber at a temperature sufficient for rapid reaction and also to carry away through the top of the tower the hydrochloric acid gas liberated by the chemical reaction. The dry powder which fell to the bottom of the chamber was removed and neutralized by mixing with a 40° Baumé solution of sodium hydroxide, only sufficient being used to neutralize the excess of sulphating agent and any small amount of hydrochloric acid which had not been volatilized. About 15 parts of sodium hydroxide were required for the present purpose. The resulting mixture in the form of a paste was then subjected to spray drying according to known practice with the use of a current of air having a temperature of about 400° F. whereby most of the water was expelled leaving a dry powder. The resulting product contained approximately 67% of the sodium salt of the alkyl sulphates, the balance consisting mainly of sodium chloride and sodium sulphate.

Other higher alcohols besides Ocenol could also be used and the neutralizing could be effected with a dry neutralizing agent such as soda ash if desired instead of using an aqueous solution of neutralizing agent. Such a product would not need a subsequent drying operation but could merely be ground for use.

It is preferable that the air or other gas used for heating should be substantially free from water vapor, because the presence of excessive quantities of water vapor in the heated gas causes the reaction to proceed with extreme rapidity with formation of by-products, so that the final product has a dark color. For this reason we prefer to use atmospheric air which has been heated indirectly rather than use the direct products of combustion which might otherwise be a convenient source of heated gas, but which always contain large proportions of water vapor. It is obvious that other gases than air may be used as the heating medium, provided that they are substantially as inert as air towards the reagents under the operating conditions.

Our process is especially desirable for the sulphation of unsaturated alcohols, because the sulphation takes place almost exclusively at the hydroxyl group with very little effect on the unsaturated bond.

Having thus described our invention, what we claim and desire to secure by Letters Patent is:

1. The process of forming a salt of a sulphuric acid ester of a higher alcohol, which comprises atomizing a preformed, substantially unreacted mixture of a higher alcohol in liquid condition and a pulverized solid sulphating agent selected from the group consisting of the reaction product of sulphur trioxide on a metal chloride, the reaction product of chlorsulphonic acid on a metal chloride, and the reaction product of chlorsulphonic acid on a metal sulphate and rapidly heating the atomized mixture to reaction temperature with a heated gas which does not enter into the reaction chemically.

2. The process of forming a salt of a sulphuric acid ester of a higher alcohol, which comprises mixing said alcohol in liquid condition with a pulverized solid sulphating agent selected from the group consisting of the reaction product of sulphur trioxide on a metal chloride, the reaction product of chlorsulphonic acid on a metal chloride, and the reaction product of chlorsulphonic acid on a metal sulphate, and spraying the substantially unreacted mixture into a heated gas whereby the said mixture is rapidly heated to reaction temperature.

3. The process of forming a salt of a sulphuric ester of a higher alcohol, which comprises atomizing a preformed, substantially unreacted mixture of a higher alcohol in liquid condition and a pulverized solid sulphating agent selected from the group consisting of the reaction product of sulphur trioxide on a metal chloride, the reaction product of chlorsulphonic acid on a metal chloride, and the reaction product of chlorsulphonic acid on a metal sulphate, rapidly heating the atomized mixture to reaction temperature with a heated gas which does not enter into the reaction chemically, and separating the product from the heated gas.

4. The process of forming a salt of a sulphuric acid ester of a higher alcohol, which comprises atomizing a preformed, substantially unreacted mixture of a higher alcohol in liquid condition and a pulverized solid sulphating agent in amount at least twenty-five per cent above the stoichiometrically calculated quantity, said reagent being selected from the group consisting of the reaction product of sulphur trioxide on a metal chloride, the reaction product of chlorsulphonic acid on a metal chloride, and the reaction product of chlorsulfonic acid on a metal sulphate, and rapidly heating the atomized mixture to reaction temperature with a heated gas which does not enter into the reaction chemically.

5. The process of forming a salt of a sulphuric acid ester of a higher alcohol, which comprises atomizing a preformed, substantially unreacted mixture of a higher alcohol in liquid condition and a pulverized solid sulphating agent in amount at least twenty-five per cent above the stoichiometrically calculated quantity, said reagent being selected from the group consisting of the reaction product of sulphur trioxide on a metal chloride, the reaction product of chlorsulphonic acid on a metal chloride, and the reaction product of chlorsulphonic acid on a metal sulphate, and rapidly heating the atomized mixture to a reaction temperature not substantially exceeding 300° F. with a countercurrent stream of heated gas which does not enter into the reaction chemically.

6. The process of forming a salt of a sulphuric acid ester of a higher alcohol, which comprises atomizing a preformed, substantially unreacted mixture of a higher alcohol in liquid condition and a pulverized solid sulphating agent selected from the group consisting of the reaction product of sulphur trioxide on a metal chloride, the reaction product of chlorsulphonic acid on a metal chloride, and the reaction product of chlorsulphonic acid on a metal sulphate, rapidly heating the atomized mixture to reaction temperature with a heated gas which does not enter into the reaction chemically, and neutralizing the product.

7. The process of forming a wetting, sudsing, emulsifying and detergent agent of the sulphuric acid ester type, which comprises atomizing a preformed, substantially unreacted mixture of a higher fatty alcohol in liquid condition and a pulverized solid sulphating agent selected from the group consisting of the reaction product of sulphur trioxide on a metal chloride, the reaction product of chlorsulphonic acid on a metal chloride, and the reaction product of chlorsulphonic acid on a metal sulphate, rapidly heating the atomized mixture to reaction temperature with a heated gas which does not enter into the reaction chemically, and neutralizing the product.

8. The process of forming a wetting, sudsing, emulsifying and detergent agent of the sulphuric acid ester type, which comprises atomizing a preformed, substantially unreacted mixture of an unsaturated higher fatty alcohol in liquid condition and a pulverized solid sulphating agent selected from the group consisting of the reaction product of sulphur trioxide on a metal chloride, the reaction product of chlorsulphonic acid on a metal chloride, and the reaction product of chlorsulphonic acid on a metal sulphate, rapidly heating the atomized mixture to reaction temperature with a heated gas which does not enter into the reaction chemically, and neutralizing the product.

9. The process of forming a salt of a sulphuric acid ester of a higher alcohol, which comprises atomizing a preformed, substantially unreacted mixture of an alcohol derived from a natural fat by hydrogenation, said alcohol being in liquid condition, and a pulverized solid sulphating agent selected from the group consisting of the reaction product of sulphur trioxide on a metal chloride, the reaction product of chlorsulphonic acid on a metal chloride, and the reaction product of chlorsulphonic acid on a metal sulphate, rapidly heating the atomized mixture to reaction temperature with a heated gas which does not enter into the reaction chemically, and neutralizing the product.

10. The process of forming a salt of a sulphuric acid ester of a higher alcohol, which comprises atomizing a preformed, substantially unreacted mixture of a higher alcohol derived from petroleum by oxidation, said alcohol being in liquid condition, and a pulverized solid sulphating agent selected from the group consisting of the reaction product of sulphur trioxide on a metal chloride, the reaction product of chlorsulphonic acid on a metal chloride, and the reaction product of chlorsulphonic acid on a metal sulphate, and rapidly heating the atomized mixture to reaction temperature with a heated gas which does not enter into the reaction chemically.

11. The process of forming a substantially dry salt of a sulphuric acid ester of a higher alcohol, which comprises atomizing a preformed, substantially unreacted mixture of a higher alcohol in liquid and substantially anhydrous condition, and a pulverized, solid, substantially dry sulphating agent selected from the group consisting of the reaction product of sulphur trioxide on a metal chloride, the reaction product of chlorsulphonic acid on a metal chloride, and the reaction product of chlorsulphonic acid on a metal sulphate, and heating the atomized mixture to reaction temperature with a substantially dry heated gas which does not enter into the reaction chemically.

12. The process of forming a substantially dry salt of a sulphuric acid ester of a higher alcohol, which comprises atomizing a preformed, substantially unreacted mixture of a higher alcohol in liquid and substantially dry condition, and a pulverized, solid, substantially dry sulphating agent in amount at least twenty-five per cent above the stoichiometrically calculated quantity, said reagent being selected from the group consisting of the reaction product of sulphur trioxide on a metal chloride, and the reaction product of chlorsulphonic acid on a metal sulphate, and heating the atomized mixture to a reaction temperature not substantially exceeding 300° F. with a heated gas which does not enter into the reaction chemically.

13. The process of forming a substantially dry salt of a sulphuric acid ester of a higher alcohol, which comprises atomizing a preformed, substantially unreacted mixture of a higher alcohol in liquid and substantially dry condition, and a pulverized, solid, substantially dry sulphating agent in amount at least twenty-five per cent above the stoichiometrically calculated quantity, said reagent being selected from the group consisting of the reaction product of sulphur trioxide on a metal chloride, the reaction product of chlorsulphonic acid on a metal chloride, and the reaction product of chlorsulphonic acid on a metal sulphate, heating the atomized mixture to a reaction temperature not substantially exceeding 300° F. with a heated gas which does not enter into the reaction chemically, and neutralizing the product formed.

VICTOR MILLS.
RICHARD C. WOOD.